(12) United States Patent
Canton

(10) Patent No.: US 9,122,549 B2
(45) Date of Patent: Sep. 1, 2015

(54) METHOD AND SYSTEM FOR EMULATION OF INSTRUCTIONS AND HARDWARE USING BACKGROUND GUEST MODE PROCESSING

(75) Inventor: Dino Canton, Nepean (CA)

(73) Assignee: WIND RIVER SYSTEMS, INC., Alameda, CA (US)

( * ) Notice: Subject to any disclaimer, the term of this patent is extended or adjusted under 35 U.S.C. 154(b) by 272 days.

(21) Appl. No.: 13/553,134

(22) Filed: Jul. 19, 2012

(65) Prior Publication Data

US 2014/0026132 A1    Jan. 23, 2014

(51) Int. Cl.
*G06F 9/455* (2006.01)
*G06F 9/54* (2006.01)
*G06F 9/44* (2006.01)

(52) U.S. Cl.
CPC ............ *G06F 9/547* (2013.01); *G06F 9/45558* (2013.01); *G06F 9/4425* (2013.01); *G06F 2009/45579* (2013.01)

(58) Field of Classification Search
None
See application file for complete search history.

(56) References Cited

U.S. PATENT DOCUMENTS

| 2008/0077917 | A1* | 3/2008 | Chen et al. ......................... 718/1 |
| 2008/0163211 | A1* | 7/2008 | Mizuno .............................. 718/1 |
| 2009/0089815 | A1* | 4/2009 | Manczak et al. ............... 719/327 |
| 2010/0332635 | A1* | 12/2010 | Rogel et al. .................... 709/223 |
| 2012/0011397 | A1* | 1/2012 | Murakami et al. .............. 714/15 |

* cited by examiner

Primary Examiner — Sisley Kim
(74) Attorney, Agent, or Firm — Fay Kaplun & Marcin, LLP

(57) ABSTRACT

A method includes receiving, from a requesting guest environment, a device call requesting access to a device; sending the device call to an emulating guest environment, the emulating guest environment emulating the device; receiving, from the emulating guest environment, a result of the device call; and sending the result of the device call to the requesting guest environment.

17 Claims, 3 Drawing Sheets

METHOD AND SYSTEM FOR EMULATION OF INSTRUCTIONS AND HARDWARE USING BACKGROUND GUEST MODE PROCESSING

BACKGROUND

Virtual operating environments are used for a wide variety of purposes. Software operating in such environments may request access to devices for the same purposes as software running in any other type of computing environment. However, in the virtualization context, the devices requested in this manner may not actually be resident on the computing system, but may themselves be virtualized. Therefore, it is desirable to virtualize such devices in a manner that uses computing resources efficiently, and provides for reasonable software development costs.

SUMMARY OF THE INVENTION

The present invention is directed to a method including receiving, from a requesting guest environment, a device call requesting access to a device; sending the device call to an emulating guest environment, the emulating guest environment emulating the device; receiving, from the emulating guest environment, a result of the device call; and sending the result of the device call to the requesting guest environment.

The present invention is further directed to a system including a memory, a processor, and a hypervisor establishing a first virtual machine and a second virtual machine. The hypervisor receives, from the first virtual machine, a device call. The hypervisor further sends the device call to the second virtual machine. The hypervisor further receives, from the second virtual machine, a result of the device call. The hypervisor further sends the result of the device call to the first virtual machine.

The present invention is further directed to a non-transitory computer-readable storage medium storing a set of instructions executable by a processor. The set of instructions perform a method including receiving, from a requesting guest environment, a device call requesting access to a device; sending the device call to an emulating guest environment, the emulating guest environment emulating the device; receiving, from the emulating guest environment, a result of the device call; and sending the result of the device call to the requesting guest environment.

DETAILED DESCRIPTION

Figure 1:
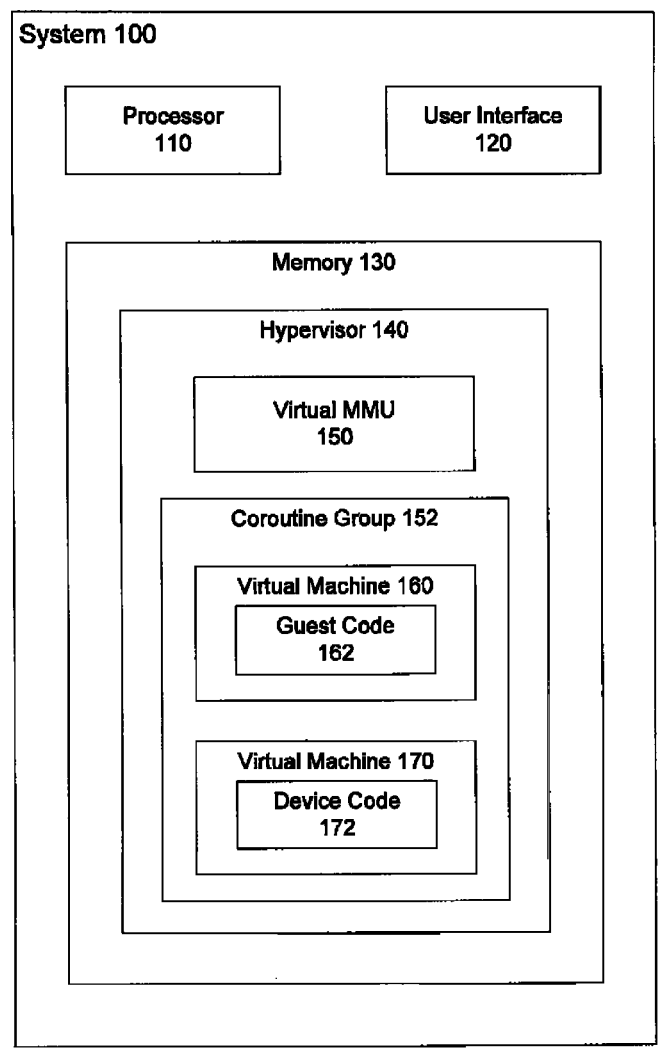
FIG. 1 shows a schematic view of a system for background guest hardware emulation according to an exemplary embodiment.

The exemplary embodiments may be further understood with reference to the following description of exemplary embodiments and the related appended drawings, wherein like elements are provided with the same reference numerals. Specifically, the exemplary embodiments relate to methods and systems for emulating instructions and hardware in a virtualized guest being operated by a hypervisor using background guest mode processing. A hypervisor may be a program executed by a processor of a computing system and capable of utilizing a portion of the resources of the computing system (e.g., processing resources, memory) to virtualize the performance of a different type of computing system having different capabilities than the computing system itself.

Software running as a guest in a virtual machine environment created by a hypervisor may be required to request access to devices for the same reasons as any other type of software. In a development environment, as well as potentially in other environments, the devices being so accessed may be virtual devices being emulated by software, rather than actual devices. Traditionally, access to emulated devices is performed using a "trap and emulate" approach. Under such an approach, a guest software application attempts to access a memory location corresponding to the emulated device. Because the memory location does not actually exist, a bus error or exception is generated as a result of the failed memory access. As a result of this error, control is transferred to the hypervisor that is providing the operating environment for the guest.

When this occurs, the hypervisor inspects the memory address that was called by the guest and determines the hardware that corresponds to the memory address. The hypervisor then determines, based on emulation code, what would occur based on the access request made by the guest. Those of skill in the art will understand that, if the device being accessed were actual rather than virtual, the hypervisor would convey the access request to the device at this point. Once the hypervisor determines the result of the device call by the guest, such result is written into the memory space of the guest and the hypervisor returns control to the guest, which may then continue execution as if the access occurred normally.

However, the inclusion of emulation code within the hypervisor itself may involve significant financial cost. Hypervisor code may typically be bundled within a certified system, wherein each line of code is inspected to verify that it performs properly; the inspection cost may be on the order of $52 per line of code. Therefore, the inclusion of the emulation code within the hypervisor increases the size of the hypervisor code, and its corresponding inspection cost; the increased cost to develop the hypervisor may be on the order of hundreds of thousands of dollars. In contrast, emulation code that is external to the hypervisor may not require the same certification standards, thereby reducing product development cost. Therefore, the exemplary embodiments may provide for device emulation external to the code of the hypervisor itself.

FIG. 1 illustrates a schematic view of an exemplary system 100. The system 100 includes a processor 110, which may be any type of processor known in the art that is appropriate for executing code as will be described in further detail below. The system 100 may also include a user interface 120, which may include both input elements (e.g., a keyboard, a mouse, a touchscreen, etc.) and output elements (e.g., a monitor, etc.). In one embodiment, the user interface 120 may include a touch-sensitive display that includes both input elements and output elements into a single component.

The system 100 also includes a memory 130 appropriate for use as will be described in further detail below. The memory 130 may comprise both data storage (e.g., a hard drive) and active memory (e.g., RAM), both types of which are referred to herein collectively as memory 130. The memory 130 stores a hypervisor 140, which, as described above, may be executed by the processor 110 and used to virtualize the performance of hardware not physically present in system 100. The hypervisor 140 executes a virtual memory management unit ("MMU") 150, which may enable the hypervisor 140 to locate processes running in various virtual machines being virtualized by the hypervisor 140.

The hypervisor 140 also executes a first virtual machine 160. The first virtual machine 160 virtualizes a computing system, including hardware and an operating system, based on parameters designated by the hypervisor 140. Within the first virtual machine 160, guest code 162 is executed; the guest code 162 may be any code that is desirable to operate using the parameters of the first virtual machine 160, rather than those of the system 100. For example, the guest code 162 may be developmental code being evaluated for its performance on a computing system having the parameters of the first virtual machine 160. The guest code 162 may be a foreground process, and may require access to a device, as described above.

The hypervisor 140 also executes a second virtual machine 170. The second virtual machine 170 may be a background process, and may execute device code 172 operable to emulate the function of a device (e.g., a network interface, a printer, or any other device with which code may interact). The device code 172 may be operable to receive inputs and return the same output as the device being virtualized would return. The first virtual machine 160 and the second virtual machine 170 may be bound to one another as coroutines in coroutine group 152. As coroutines, the first virtual machine 160 and the second virtual machine 170 may operate cooperatively, using shared resources. Control may be transferred explicitly from virtual machine to virtual machine, with only one of the two ever active at any given time. Threads within the system continue to be scheduled as per the system scheduler's policy, but only one entity of the coroutine group 152 is schedulable at any given time. Each context in the coroutine group 152 provides a persistent state model and resources, including a per-coroutine context, stack and register set.

Figure 2:
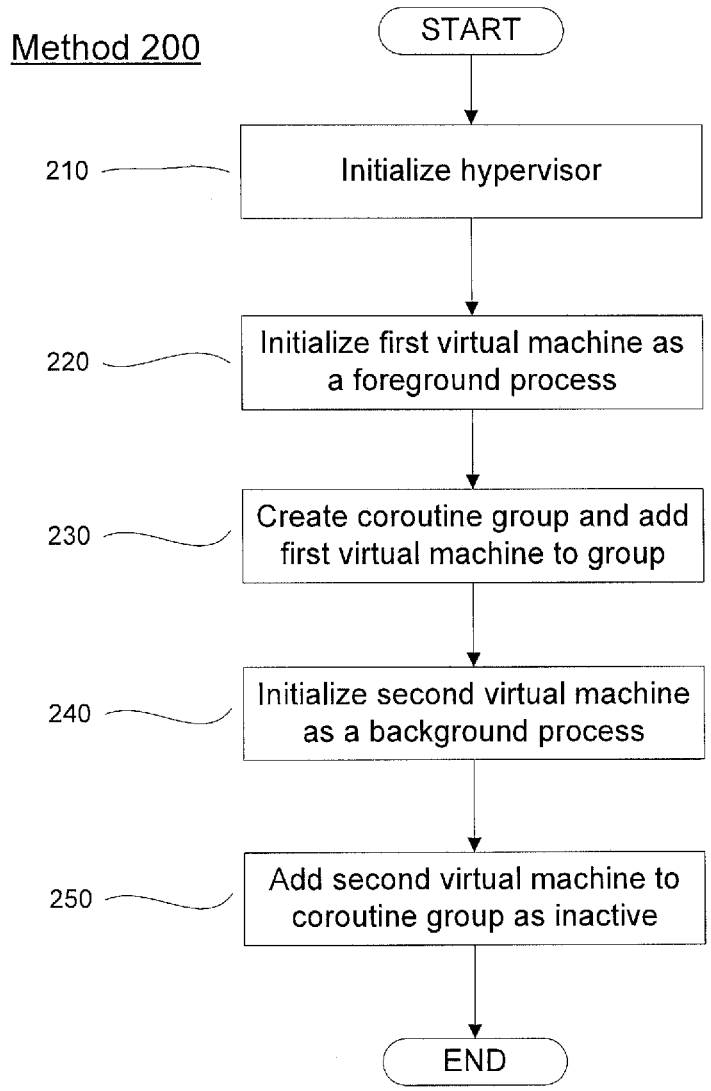
FIG. 2 shows an exemplary method for initializing a background guest hardware emulation system such as the system of FIG. 1.

FIG. 2 illustrates an exemplary method 200 by which a system for hardware virtualization may be initialized. The method 200 will be described herein with reference to the exemplary system 100, but those of skill in the art will understand that the method 200 is not limited to the system 100, and may be performed by any other system capable of performing the functions described herein. In step 210, a hypervisor 140 is executed. This may involve a processor 110 executing code embodying the hypervisor 140 in response to a user input via user interface 120 to bring the processor into active memory 130. Step 210 may also involve initializing a virtual MMU 150 to manage the memory of virtual environments that may be initialized within the hypervisor 140.

In step 220, the hypervisor 140 initializes a first virtual machine 160 in the foreground. The virtual machine 160 virtualizes hardware and software as described above, including a guest operating system. This step may entail the hypervisor 140 creating a foreground runtime context, creating a foreground virtual machine, allocating guest memory, mapping the guest memory as part of the foreground virtual machine, and configuring memory input/output and access rights. Also as part of step 210, the hypervisor 140 loads guest code 162 into the virtual machine 160 and configures the thread so that the guest code 162 is executed; the guest code 162 may be any code that may subsequently be required to access a device, as will be described in further detail herein.

In step 230, the hypervisor 140 creates a coroutine group 152 into which the first virtual machine 160 is placed, and into which the second virtual machine 170 will be placed once it has been created. The virtual machine 160 and the virtual machine 170 will therefore share a memory space, and switches between the two may be accomplished by the hypervisor 140 without involving the broader operating system of the system 100 or using a rescheduling algorithm. This enables switches between the virtual machine 160 and the virtual machine 170 to occur faster than they otherwise could. Those of skill in the art will understand that the shared memory space may include the CPU registers of the virtual machines 160 and 170.

In step 240, the hypervisor 140 initializes a second virtual machine 170. The virtual machine 170 also virtualizes hardware and software as described above, including a guest operating system or device emulation application. This may involve creating a background runtime context and a background virtual machine, mapping the foreground memory to be part of the background virtual machine, and configuring input/output and access rights (which may differ from those of the foreground virtual machine). The hypervisor 140 also configures the thread of the virtual machine 170 so that the device code 172 is executed when the hypervisor 140 passes control to the virtual machine 170. The device code 172 may be operable to receive the input and provide output in the same manner as a device that is being virtualized by the device code 172. The device so virtualized may be any device that may be accessed by the guest code 162. In step 250, the virtual machine 170 is added to the coroutine group 152 as an inactive context.

Figure 3:
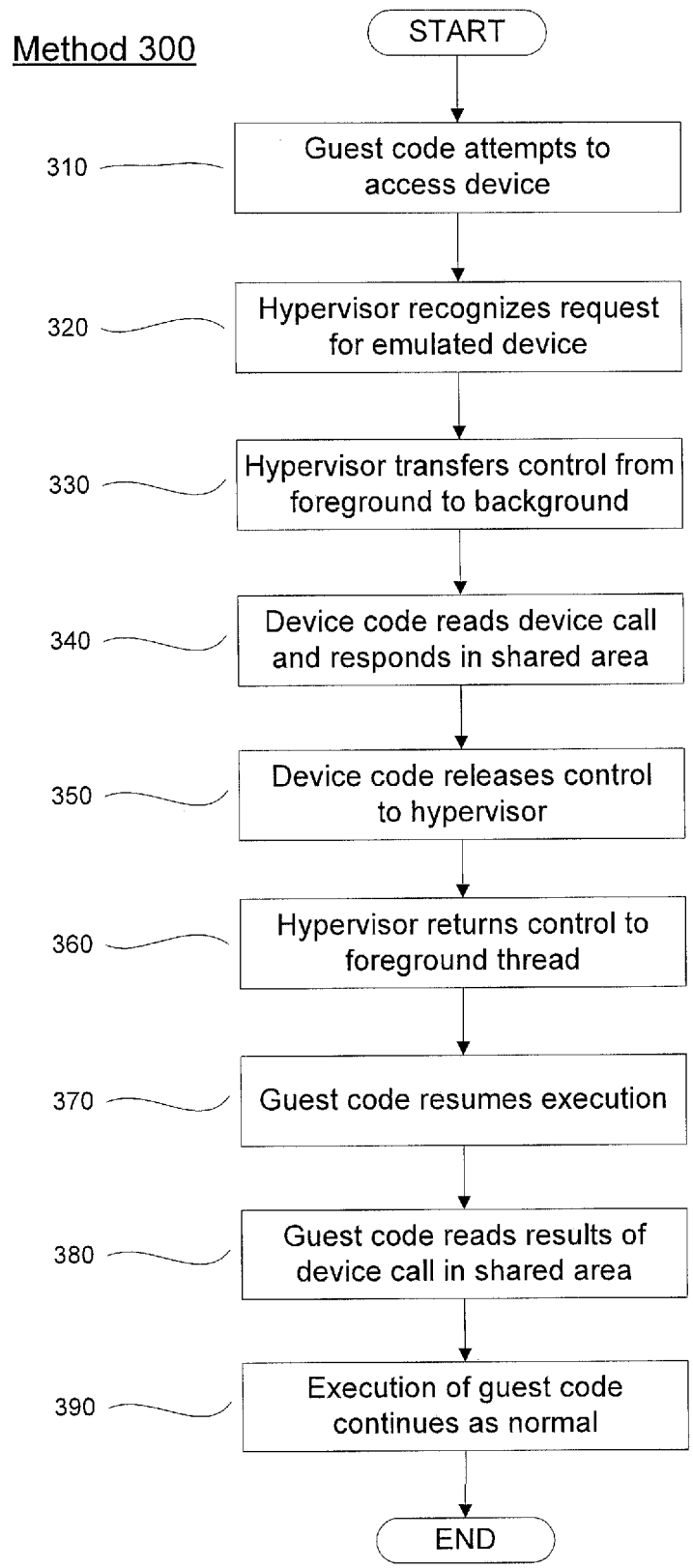
FIG. 3 shows an exemplary method for background guest hardware emulation using a system such as the system of FIG. 1.

FIG. 3 illustrates an exemplary method 300 for hardware virtualization. As was the case for method 200 of FIG. 2, the method 300 will be described with reference to the exemplary system 100, but those of skill in the art will understand that the method 300 is not limited to the system 100, and may be performed by any other system capable of performing the functions described hereinafter. In step 310, the guest code 162 attempts to access the virtualized device. Because the memory space for the device is inaccessible, an exception is generated and control of the process is transferred to the hypervisor 140. In step 320, the hypervisor 140 inspects the memory address that generated the fault, and recognizes that the address corresponds to the guest emulated device of the device code 172. In step 330, the hypervisor 140 suspends the execution of the foreground thread containing guest code 162 and transfers control to the background thread containing device code 172. In step 340, the device code 172 reads the data that was part of the device call made by the guest code 162, which is in a memory space shared between the two threads, processes the data, and provides an output that is the same as would be generated by the device being virtualized. This act by the device code 172 includes emulating the instruction that caused the access to occur; thus, the state of the foreground thread will be updated to reflect that the instruction has completed, and the program counter of the guest code 162 is advanced. The output, like the device call, is stored in the same memory space that is shared between the two threads.

In step 350, the thread containing the device code 172 releases control to the hypervisor 140. This may involve the use of a "halt" instruction to transfer control from the virtual machine 170 to the hypervisor 140 or, the invocation of a hypercall to perform the context change. In step 360, the hypervisor returns control to the foreground thread; this automatically suspends the virtual machine 170 and reactivates the virtual machine 160.

In step 370, the guest code 162 resumes executing due to this activation. In step 380, the guest code 162 receives the results of the device call in the shared memory space and uses the results in the same manner as if the results had been received from the device being virtualized by the device code 172. Because the device code 172 has acted on the device call within memory space that is shared with the guest code 162, and the program counter of the guest code 162 has been advanced by the performance of the device call by the device code 172, the guest code 162 does not need to perform any additional steps to access the results, but, rather, simply continues executing as if it had performed an actual device access and received results thereof in a standard manner. In step 390, the guest code 162 continues executing per its contents. After step 390, the method 300 terminates.

Those of skill in the art will understand that method 200 encompasses the initialization of a system 100 including device code 172, and that method 300 encompasses the use of device code 172 in response to a device call by guest code 162. It will be apparent that, once initialized by a method such as the method 200, a device virtualization system such as the system 100 may handle multiple device calls from the guest code 162. In such an embodiment, a method such as method 300 may be repeated for each such device call.

The exemplary embodiments may provide for guest mode emulation of a variety of devices. Emulation may be accomplished using coroutines in order that access requests may proceed using shared resources in the manner described above, and in an efficient manner because switching from guest code to emulation code running as a coroutine and vice versa does not involve the use of a rescheduling algorithm. Because the emulation code is in a dedicated separate code module, rather than in the hypervisor itself, the emulation code is not required to be held to as high a certification standard as the hypervisor itself, minimizing software development costs while providing similar emulation performance.

Those of skill in the art will understand that the above-described exemplary embodiments may be implemented in any number of matters, including as a software module, as a combination of hardware and software, etc. For example, the exemplary method 200 may be embodied in a program stored in a non-transitory storage medium and containing lines of code that, when compiled, may be executed by a processor. Additionally, while the above-described exemplary embodiments make specific reference to a virtual emulated device, in other embodiments the virtual device may be a physical device having its address translated in memory. This may be desirable, for example, if a guest OS includes a device driver for a type of device (e.g., an Ethernet device), but a different device of the type; when the foreground guest OS attempts to access the memory space corresponding to the included device driver, the hypervisor may translate the request to an action against real hardware existing in the system that is mapped into the background guest OS's memory map.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
    receiving, from a requesting guest environment by creating a first virtual machine, a device call requesting access to a device, wherein the requesting guest environment as a part of the first virtual machine contains a developmental code being evaluated for the first virtual machine performance on a computing system having parameters of the first virtual machine;
    sending the device call to an emulating guest environment by creating a second virtual machine, the emulating guest environment emulating the device, wherein the emulating guest environment as a part of the second virtual machine contains a device code operable to emulate the function of the device and to read the data that was part of the device call made by the developmental code and return the same output as the device being virtualized would return;
    receiving, from the emulating guest environment, a result of the device call; and
    sending the result of the device call to the requesting guest environment, wherein the requesting guest environment and the emulating guest environment are coroutines as a group, wherein a coroutine comprises a cooperative operation of the requesting guest environment and the emulating guest environment, where the requesting guest environment and the emulating guest environment use shared resources, and wherein control of the method switches between the requesting guest environment and the emulating guest environment so that only one of the requesting and emulating guest environments is active at a time.

2. The method of claim 1, wherein the method is performed by a hypervisor.

3. The method of claim 1, wherein the device call and the result of the device call are written in a memory area that is shared by the requesting guest environment and the emulating guest environment.

4. The method of claim 1, wherein the device call is generated by a guest code module running in the requesting guest environment.

5. The method of claim 4, wherein the guest code module is a developmental code module.

6. The method of claim 1, wherein the emulating guest environment comprises one of a physical device having an address that is translated in memory and a code module emulating a physical device.

7. The method of claim 1, further comprising:
    detecting an exception in the requesting guest environment, wherein the exception indicates the device call.

8. The method of claim 1, further comprising:
    detecting a release of control from the emulating guest environment, wherein the release of control indicates the result of the device call.

9. The method of claim 8, wherein the release of control is detected based on one of a halt instruction and a hypercall.

10. A system, comprising:
    a memory;
    a processor; and
    a hypervisor establishing a requesting first virtual machine and an emulating second virtual machine, wherein the requesting first virtual machine and the emulating second virtual machine are coroutines,
    wherein the hypervisor receives, from a requesting guest environment by creating the requesting first virtual machine, a device call requesting access to a device, wherein the requesting guest environment as a part of the requesting first virtual machine contains a developmental code being evaluated for the requesting first virtual machine performance on a computing system having parameters of the requesting first virtual machine;
    sends the device call to an emulating guest environment by creating the emulating second virtual machine, the emulating guest environment emulating the device, wherein the emulating guest environment as a part of the emulating second virtual machine contains a device code operable to emulate the function of the device and to read the data that was part of the device call made by the developmental code and return the same output as the device being virtualized would return;

receives, from the emulating guest environment, a result of the device call; and sends the result of the device call to the requesting guest environment, wherein the requesting guest environment and the emulating guest environment are coroutines as a group, wherein a coroutine comprises a cooperative operation of the requesting guest environment and the emulating guest environment, where the requesting guest environment and the emulating guest environment use shared resources, and wherein control of the method switches between the requesting guest environment and the emulating guest environment so that only one of the requesting and emulating guest environments is active at a time.

11. The system of claim 10, wherein the device call and the result of the device call are written in a shared memory area that is shared by the requesting first virtual machine and the emulating second virtual machine.

12. The system of claim 10, wherein the device call is generated by a guest software module running in the requesting first virtual machine.

13. The system of claim 10, wherein the guest software module is a developmental software module.

14. The system of claim 9, wherein the emulating second virtual machine comprises one of a physical device having an address that is translated in memory and a code module emulating a physical device.

15. A non-transitory computer-readable storage medium storing a set of instructions executable by a processor, the set of instructions performing a method comprising:

receiving, from a requesting guest environment by creating a first virtual machine, a device call requesting access to a device, wherein the requesting guest environment as a part of the first virtual machine contains a developmental code being evaluated for the first virtual machine performance on a computing system having parameters of the first virtual machine;

sending the device call to an emulating guest environment by creating a second virtual machine, the emulating guest environment emulating the device, wherein the emulating guest environment as a part of the second virtual machine contains a device code operable to emulate the function of the device and to read the data that was part of the device call made by the developmental code and return the same output as the device being virtualized would return;

receiving, from the emulating guest environment, a result of the device call; and sending the result of the device call to the requesting guest environment, wherein the requesting guest environment and the emulating guest environment are coroutines as a group, wherein a coroutine comprises a cooperative operation of the requesting guest environment and the emulating guest environment, where the requesting guest environment and the emulating guest environment use shared resources, and wherein control of the method switches between the requesting guest environment and the emulating guest environment so that only one of the requesting and emulating guest environments is active at a time.

16. The non-transitory computer-readable storage medium of claim 15, wherein the device call is generated by a guest code module running within the requesting guest environment.

17. The non-transitory computer-readable storage medium of claim 15, wherein the result of the device call is generated by a virtual device running within the emulating guest environment.

* * * * *